US005831862A

United States Patent [19]

Hetrick et al.

[11] Patent Number: 5,831,862

[45] Date of Patent: Nov. 3, 1998

[54] AUTOMATIC TRANSACTION SYSTEM WITH A DYNAMIC DISPLAY AND METHODS OF ITS OPERATION

[75] Inventors: Michael C. Hetrick, Medford, N.J.; Frank Mars, McLean, Va.; Robert D. Ross, Gibbsboro, N.J.

[73] Assignee: Mars, Incorporated, McLean, Va.

[21] Appl. No.: 692,261

[22] Filed: Aug. 5, 1996

[51] Int. Cl.[6] .......... G06F 19/00

[52] U.S. Cl. .......... 364/479.02; 221/8; 221/9; 364/479.06

[58] Field of Search .......... 364/479.02, 479.04, 364/479.06, 479.07; 395/222, 227, 228, 229; 340/825.35; 221/2, 5, 6, 8, 9; 235/381; 705/22, 27, 28, 29

[56] References Cited

U.S. PATENT DOCUMENTS

| | | | |
|---|---|---|---|
| 4,551,935 | 11/1985 | Bachmann et al. | 40/584 |
| 4,554,419 | 11/1985 | King et al. | 200/317 X |
| 4,677,565 | 6/1987 | Ogaki et al. | 364/479.04 |
| 4,706,794 | 11/1987 | Awane et al. | 221/2 X |
| 4,896,791 | 1/1990 | Smith | 364/479.04 X |
| 4,970,811 | 11/1990 | Chang | 40/538 X |
| 5,091,713 | 2/1992 | Horne et al. | 235/381 X |
| 5,113,351 | 5/1992 | Bostic | 235/381 X |
| 5,305,197 | 4/1994 | Axler et al. | 364/479.04 X |
| 5,386,462 | 1/1995 | Schlamp | 364/479.04 X |
| 5,408,417 | 4/1995 | Wilder | 235/381 X |
| 5,442,567 | 8/1995 | Small | 235/381 X |
| 5,445,295 | 8/1995 | Brown | 221/3 |
| 5,451,998 | 9/1995 | Hamrick | 348/13 |
| 5,559,714 | 9/1996 | Banks | 364/479.03 |

*Primary Examiner*—Joseph Ruggiero
*Attorney, Agent, or Firm*—Fish & Richardson P.C.

[57] ABSTRACT

An automatic transaction apparatus, such as a vending machine, containing a current inventory of products for purchase and including a display unit. The current product inventory stored in the apparatus is monitored and representations of products appearing on the display unit are changed in response to monitoring the current product inventory. Methods of operating the automatic transaction apparatus are also disclosed.

18 Claims, 8 Drawing Sheets

AUTOMATIC TRANSACTION SYSTEM WITH A DYNAMIC DISPLAY AND METHODS OF ITS OPERATION

BACKGROUND OF THE INVENTION

The invention relates to an automatic transaction system with a dynamic display and to methods of its operation.

Automatic transaction systems, such as vending machines, have improved the automation of the sale of products and services to customers. For example, vending machines for soft drinks, candy bars, and other low cost consumable items typically allow a customer to purchase products by inserting money into an appropriate slot in the machine and by pulling a lever or pressing a button to cause a selection of the desired product. The machine then provides the selected product to the customer through an opening or chute.

In known automatic transaction systems, the various selections that are available from the vending machine typically are either shown directly through a window or are represented pictorially by pictures or other illustrations installed, for example, on the front of the machine. One known type of vending machine displays a series of items on shelves. The customer can view these items through a glass window. Below each shelf of items, a selection indicator, such as a number, letter or combination of numbers and letters, is provided. In order to purchase a desired item, the user typically is required to deposit the appropriate amount of money into a slot in the vending machine and to enter on a keypad, for example, the combination of letters and/or numbers corresponding to the desired item. The machine then determines whether a sufficient amount of money has been deposited. If the determination is positive, the machine activates an electromechanical mechanism, such as a motor driven helical wire dispenser which moves the purchased item beyond the shelf through a complete rotation of the helical wire cage, causing the item to drop by gravity down through a chute, where the customer can retrieve it.

One disadvantage with such vending machines is that as the items on a particular shelf sell out, the spirals become empty. The products may not be replenished immediately, and the empty spirals remain viewable by customers. As more spirals become empty, the machine appears less attractive than when full.

Furthermore, the ability of consumers to view the empty spirals or empty shelves may lead to consumer perceptions that are undesirable from the standpoint of the vendor. For example, upon seeing the empty shelves, some consumers may believe, incorrectly, that inventory remaining in the machine is stale or that the machine itself is not operating properly.

Other known vending machines convey information by representing the products or items through pictures or other illustrations on the front of the machine. Such vending machines can also lead to undesired customer frustration. A customer may for example, become frustrated by the fact that a particular item is advertised as generally available from the machine, but is not presently available for purchase by the customer.

SUMMARY OF THE INVENTION

In general, in one aspect, the invention includes a method of operating an automatic transaction apparatus, such as a vending machine, containing a current inventory of products for purchase and including a display unit. The current product inventory stored in the apparatus is monitored, and representations of products appearing on the display unit are changed in response to monitoring the current product inventory.

In another aspect, the invention includes a method of operating a display unit as part of an automatic transaction apparatus wherein the method includes monitoring the current availability for purchase of product inventory stored in the apparatus, and removing from the display unit, in response to monitoring, representations of products that are not currently available for purchase from the apparatus.

The invention also includes an automatic transaction apparatus having a front panel and a display unit located on the front panel for displaying representations of products available for purchase from the apparatus. The apparatus also includes a vend dispensing unit for dispensing a selected one of the products and detectors for monitoring product inventory currently stored in the apparatus. The apparatus further includes a processor for controlling the display unit in response to signals generated by the detectors so as to display on the display unit representations only of products currently stored in the apparatus.

In certain implementations, the apparatus includes second detectors for monitoring the current availability of various product types for delivery from the apparatus. The processor controls the display unit to display representations only of products currently available for delivery from the apparatus.

In various implementations of the invention, the display panel includes, for example, a video screen, a rear projection display, a flat screen display, a flip screen, or one or more cathode ray tubes (CRTs). Other types of dynamic or intelligent displays may also be used. A vending machine controller controls the display which may show still or dynamic images of the available products depending on the particular display utilized.

In yet another implementation of the invention, the display may include a touch screen or other interactive overlay which allows the customer to select an item by touching, for example, the corresponding image on the screen. In yet further implementations, other customer information, such as credit accumulation, vend instructions and service information may also be integrated into the display system.

Other features as well as advantages of the invention will be more clearly understood by referring to the following detailed description, accompanying drawings and the claims.

DESCRIPTION OF THE PREFERRED EMBODIMENTS

Figure 1:
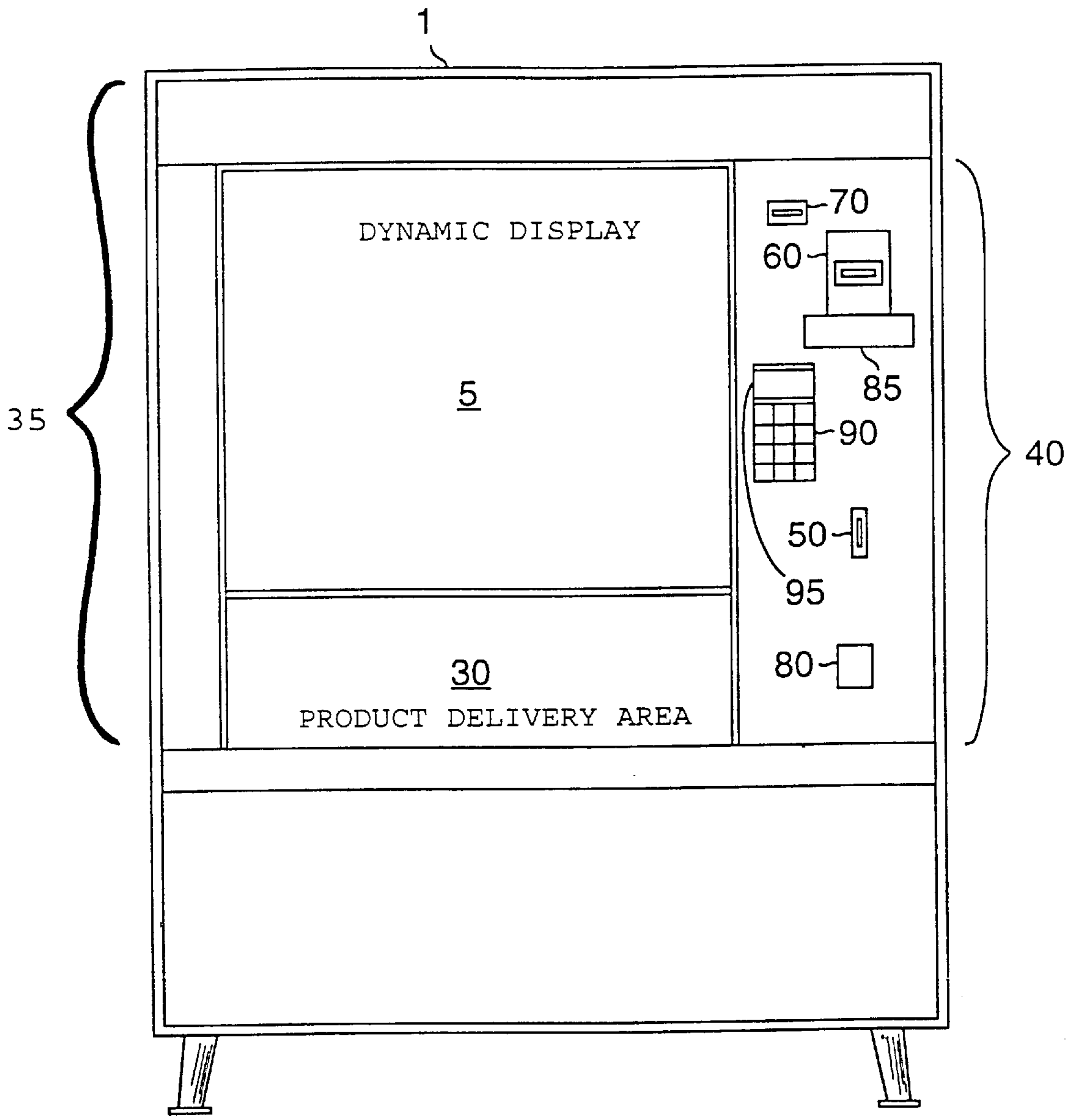
FIG. 1 is a front view of an automatic transaction system according to the invention.
Figure 2:
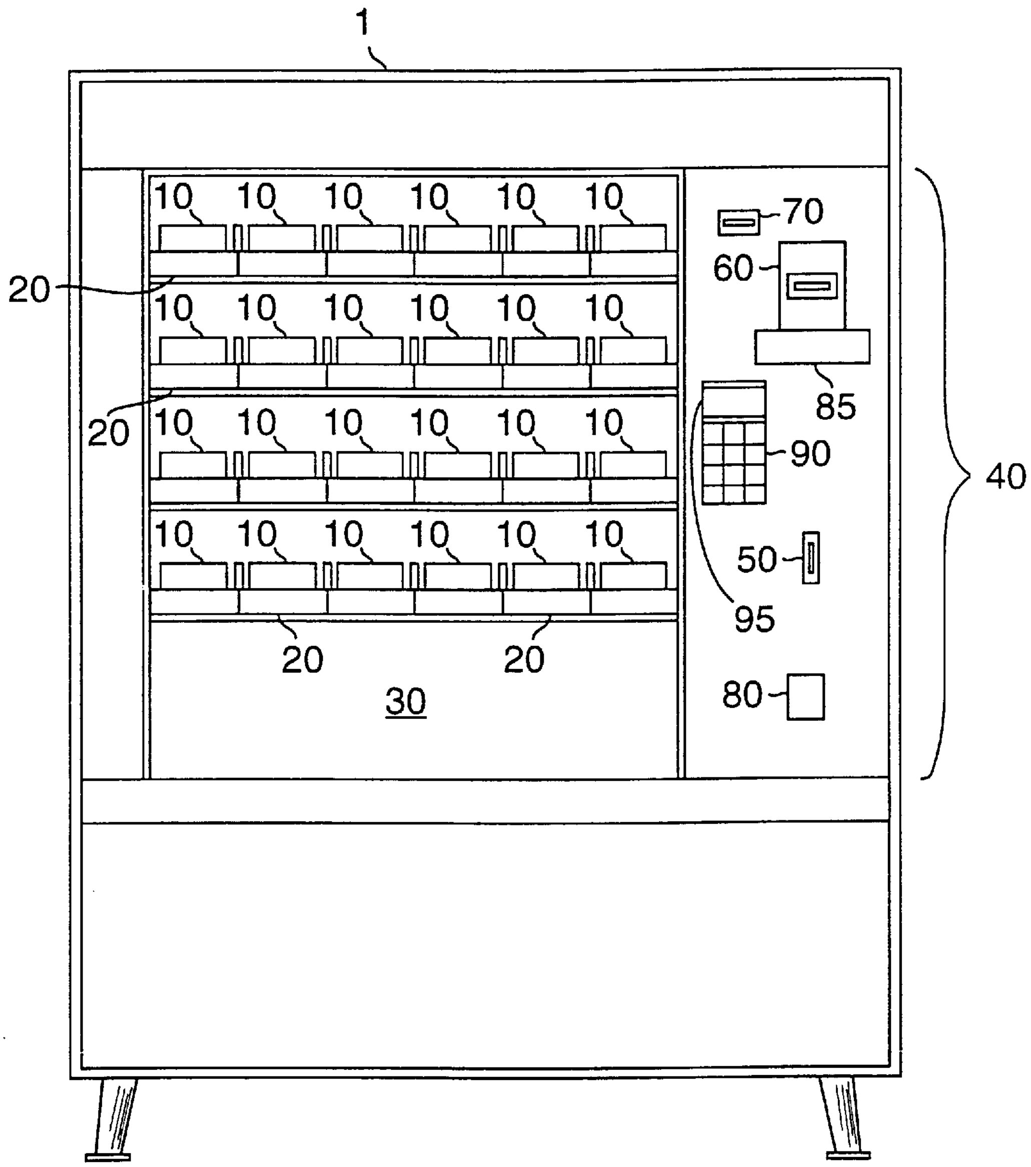
FIG. 2 is a front view of the automatic transaction system with the dynamic display panel removed.

FIGS. 1 and 2 show an automatic transaction system 1, which may be used for the dispensing of items including the vending of products, such as drinks, snacks, candies, toiletries, or other items. Referring to FIGS. 1 and 2, the automatic transaction system 1 includes a variety of products 10 to be dispensed which are stored in an area inaccessible to customers, such as behind a dynamic display 5 located on the front panel 35 of the system 1. In FIG. 2, the automatic transaction system 1 is shown with the dynamic display panel 5 removed so as to permit a view of the products 10 stored within the system 1. Each product 10 is retained by a product delivery apparatus 20 which may be selectively actuated to dispense the product into a delivery area 30 that is accessible to the customer. Suitable product delivery apparatus 20 include vend motors and solenoids as well as others well known in the art. Examples of such apparatus include those described in U.S. Pat. Nos. 4,458,187 and 4,785,927, assigned to the assignee of the present invention, which are hereby incorporated by reference.

A control panel 40 of the automatic transaction system 1 contains a coin slot 50 and a banknote or bill insert slot 60 which accept currency to initiate a vend operation. The control panel 40 may further contain a card acceptor 70 to enable customers to initiate a transaction with credit or debit cards. In addition, an electronic purse device in the form of a card may be inserted into the card acceptor 70 to initiate a transaction. The term "electronic purse device" is used herein to denote a token or card possessing an electronic circuit, a magnetic strip or other data storing medium or circuitry, for retaining a credit value of a particular currency.

A coin return 80, a bill payout recess 85 and an item selector such as a keypad 90 are also provided in the control panel 40. A display 95 on the control panel 40 provides instructions and information to the customer. Suitable displays 95 include, for example, dot-matrix displays or selectively activatable message lights.

A customer can initiate a transaction by depositing coins or bills in the slots 50 or 60, respectively. Alternatively, the customer can insert an electronic purse device, or a debit or credit card in the card acceptor 70 to initiate a transaction. Once sufficient payment has been deposited in the automatic transaction system 1, the customer may select a product 10 to be dispensed using, for example, the keypad 90. The corresponding product delivery apparatus 20 will then dispense the selected product 10 to the product delivery area 30 where it may be retrieved by the customer. Any resulting change from the transaction can be paid out through the coin return 80, the bill payout recess 85 or credited to an inserted electronic purse device.

Figure 3:
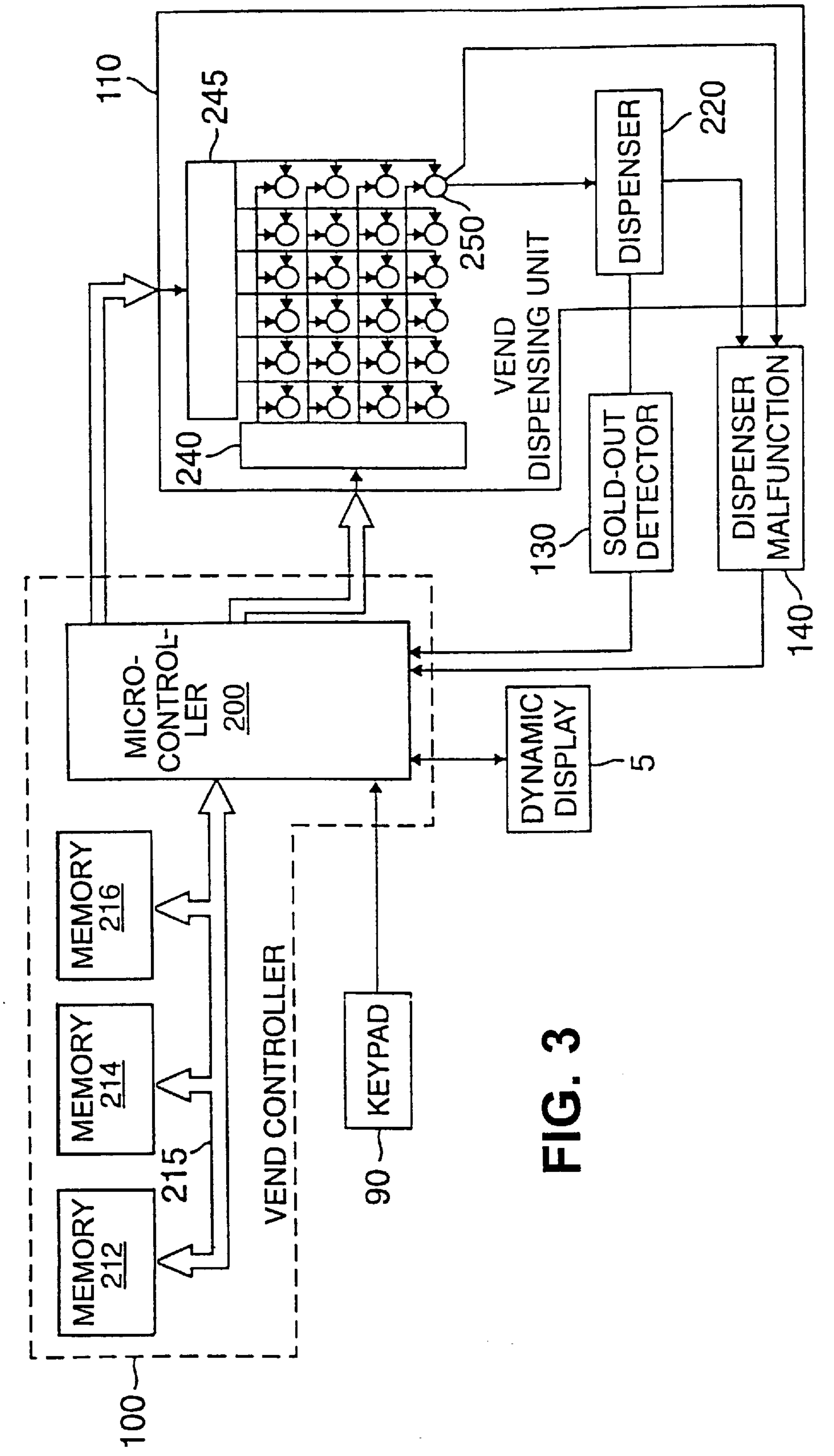
FIG. 3 is a partial schematic block diagram of electrical components of the automatic transaction system.

FIG. 3 is a block diagram showing electrical connection of an exemplary transaction or vend controller 100 to certain system components. The transaction controller 100 includes a processor, such as a microprocessor 200 connected to memories 212, 214 and 216 via data and address lines 215. Alternative suitable processors for the controller 100 include microcontrollers, programmable logic arrays and application specific integrated circuits.

The memories 212, 214 and 216 may be random-access memory (RAM), read-only memory (ROM) and electronically erasable-programmable read-only memory (EEPROM), respectively. These memories can reside in one or more integrated circuit chips. The three memories 212, 214 and 216 are shown for exemplary purposes only. The present invention may include any number of application suitable memory types.

The microprocessor 200 communicates with a vend dispensing circuit 110, as well as other components, not shown, such as a coin mechanism and a bill validator for authenticating and determining the denomination of coins and bills inserted into the slots 50 and 60. The microprocessor 200 also receives signals from the keypad 90. In addition, display or other information can be communicated between the microprocessor 200 and the dynamic display 5, as described in greater detail below.

The microprocessor 200 executes program code stored in memory, such as the ROM memory 214, to control the operations of the automatic transaction apparatus 1. Pricing information and other service data can be retained in the EEPROM memory 216. Intermediate or temporary data generated by the micro-processor 200 during, before or after a transaction can be retained in the RAM memory 212.

The microprocessor 200 controls the dispensing of a product by the vend dispensing circuit 110 when sufficient credit is available based upon coins or bills deposited into the slots 50 or 60. The vend dispensing circuit 110 can be one of several vend dispensing circuits well known in the art, including, for example, the circuit described in the aforementioned U.S. Pat. No. 4,785,927.

A typical vend dispensing circuit 110 includes a row selector 240 and a column selector 245 connected to each one of a plurality of vend motors, such as vend motor 250. Each vend motor 250 is disposed in a respective one of the product delivery apparatus 20, shown in FIG. 1. A product will be dispensed by the operation of the corresponding vend motor 250 that receives select signals simultaneously from both the row and column selectors 240 and 245. Each selector 240 and 245 is operable to select only one row and column at a time. The microprocessor 200 controls the row and column selectors 240 and 245 to select a vend motor 250 in a product delivery apparatus 20 to dispense a product based on the selection made by the customer, for example, via the keypad 90. The operation of each respective vend motor controls an associated product dispenser to dispense a product from the particular dispenser. For, example, a product dispenser 220 is associated with and controlled by the operation of the vend motor 250. The product dispenser 220 may, suitably be, for example, a motor driven helical wire dispenser or other electromechanical mechanism known in the art. The other vend motors similarly control respective product dispensers (not shown) to dispense items stored in the apparatus.

According to the invention, images, pictures, illustrations or alpha-numeric representations of the products presently available for purchase from the system 1 preferably appear on the dynamic display 5. The image or other representation of a product can also include a corresponding code which the customer enters on the keypad 90 in order to select the particular product. According to different implementations, the dynamic display 5 can include, for example, a video screen, a rear projection screen, a flat screen display, a flip screen, or one or more cathode ray tubes (CRTs). Furthermore, depending upon the type of display which is used, dynamic or video images, as well as still images or pictures, can appear on the display.

The particular images or other product representations appearing on the dynamic display 5 preferably change based upon the inventory currently stored in or available from the system 1. Specifically, the particular images appearing on the dynamic display 5 change in response to signals received from the processor 200 which monitors the current state of the product inventory in the vending apparats 1. In one arrangement, for example, only images of those products which are presently stored in the system 1 would appear on the display 5. In another arrangement, for example, only images of those products which are presently available for delivery from the apparatus 1 would appear on the display 5.

To permit the processor 200 to monitor the current state of the system's product inventory, a sold-out detector or sensor is associated with each product dispenser in each vend delivery apparatus 20. For example, a sold-out detector 130 is associated with the dispenser 220. Such sold-out detectors are known in the art, and may comprise, for example, micro-switches or photoelectric devices which sense or detect the presence or absence of articles in each respective product dispenser. Each sold-out detector, such as the sold-out detector 130, also preferably generates a signal which indicates the presence or absence of products in the corresponding dispenser 220. These signals are received and recognized by the processor 200 and are used by the processor 200 to monitor the current state of the system's product inventory. In particular, the processor 200 uses the signals received from each sold-out detector to determine whether a particular product in the machine is sold-out, and, therefore, unavailable for purchase.

Other techniques can also be employed to permit the processor 200 to monitor the inventory presently stored in the system 1. For example, the amount and type of product stored in each product dispenser, such as the product dispenser 220, could be entered during servicing of the system 1 by using service keypads and service input/output ports associated with some vending machines and typically accessible only to service personnel. This information would then be stored in the transaction controller 130. The processor 200 would monitor the number of products which remain in each product dispenser, for example, by using the previously stored information and tracking the number of products dispensed from each product dispenser.

Situations may arise in which a particular product is currently unavailable from the system 1 even though that product is presently stored in the system 1. For example, a component of the vend dispensing unit 110 may be inoperable due to a malfunction. Thus, in addition to monitoring whether each product type is presently stored in the system 1, the processor 200 also preferably monitors the availability of each product by receiving signals from a plurality of dispenser malfunction detector circuits, such as the malfunction detector circuit 140, each of which detects specified malfunctions associated with a particular dispenser and motor. The malfunction detector circuit 140, for example, would detect specified malfunctions associated with the dispenser 220 and the motor 250. The specified malfunctions, for example, would render the selected product unavailable for delivery even though the product remains stored in the dispenser 220.

Each malfunction detector, such as the detector 140, also preferably generates signals which indicate whether the corresponding motor 250 and dispenser 220 are functioning properly so as to be capable of delivering a particular product. These signals are received and recognized by the processor 200 and are also used by the processor 200 to monitor the current availability of the particular products. In particular, the processor 200 uses the signals received from each malfunction detector to determine when a particular product in the machine is no longer available for delivery.

The various images or other representation for each product can be stored in memory, such as EEPROM, flash RAM, disk or CD-ROM or other suitable memory. Such memory can be incorporated in or attached to the transaction controller 130. For example, in one implementation, the product images are stored in the EEPROM memory 216. The processor 200 controls which of these images and/or representations are transmitted for display to the dynamic display 5, preferably based upon the presently available inventory stored in the system 1. According to one implementation, after each vend operation whereby a product is dispensed, the processor 200 determines which images are to be displayed based upon signals received from the sold-out detectors and the dispenser malfunction detector circuits, such as the sold-out detector 130 and the dispenser malfunction detector circuit 140. The processor 200 then sends the selected images or other product representations to the display 5 where they are displayed.

Alternatively, the images or other representations of the products can be stored in memory associated with the display 5. Once the processor 200 determines which images are to be displayed, it would send signals indicating the selection of images to be displayed to the display 5. The display would then respond by displaying only the selected images.

Figure 4:
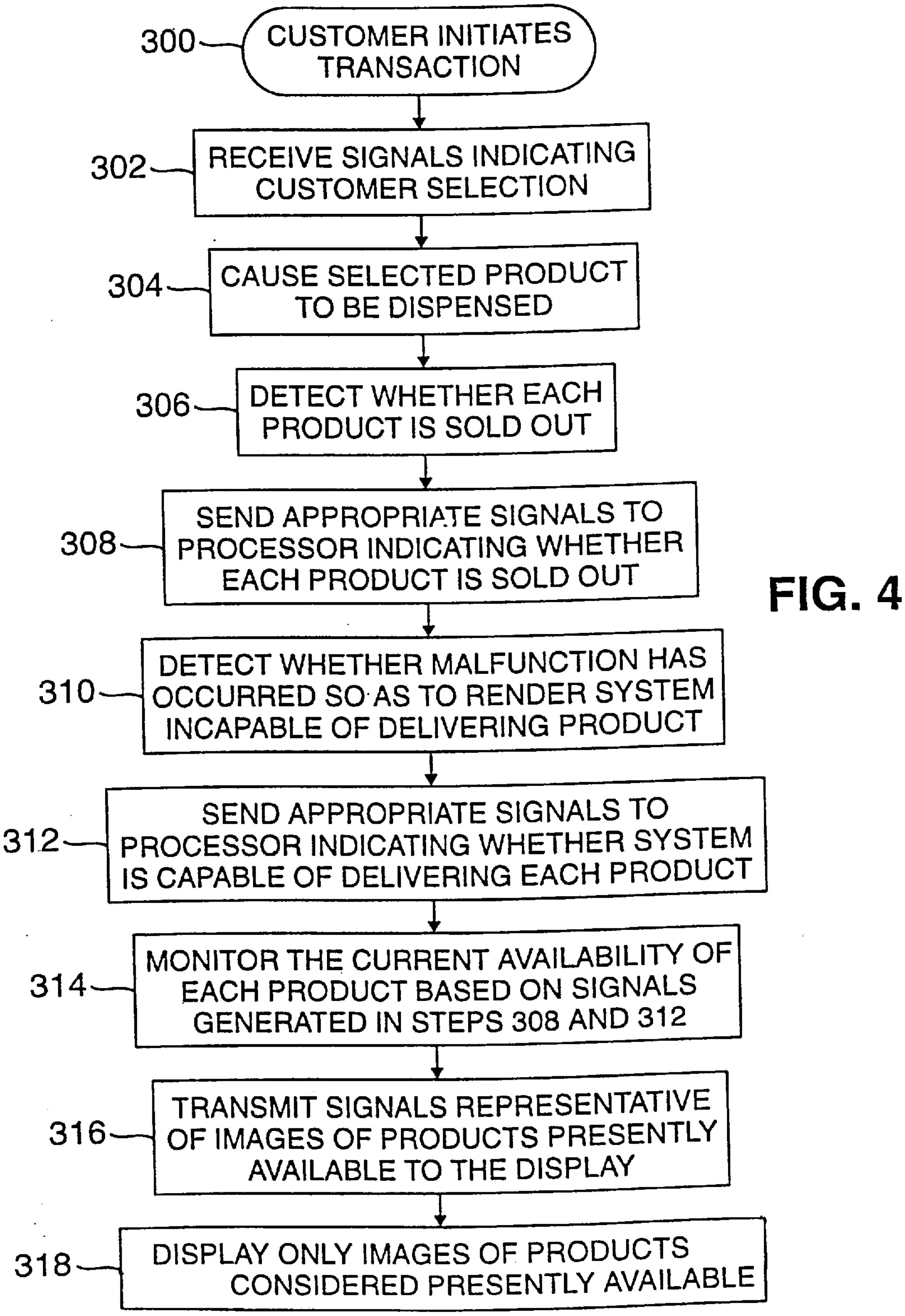
FIG. 4 is a flow chart showing the steps according to one implementation of the invention.

FIG. 4 is a flow chart showing the steps of one implementation of the operation of the system 1. As indicated by 300, a transaction is initiated in the automatic transaction system 1, for example, when a customer deposits coins or bills in the appropriate slot 50 or 60. When the customer selects a product to be dispensed by using the keypad 90, the transaction controller 200 receives signals from the keypad 90 indicating the customer's selection, as indicated by step 302. If sufficient payment has been deposited, then during normal operation, the controller 200 causes the selected product to be dispensed from the appropriate product delivery apparatus, such as the dispenser 220, as indicated by step 304. The corresponding sold-out detector 130 then detects whether the items stored in the dispenser 220 are sold out and sends an appropriate signal to the processor 200, as shown respectively by steps 306 and 308. Similarly, the malfunction detector 140 detects whether any specified malfunctions have occurred that would render the system 1 incapable of delivering the particular product stored in the dispenser 220 and sends an appropriate signal to the processor 200, as shown respectively in steps 310 and 312. Preferably, each of the sold-out detectors and malfunction detectors associated with the other product delivery apparatus periodically or regularly provides signals to the processor 200 so as to update the processor 200 as to the present availability of the various items stored in the dispensers.

Next, as indicated by step 314, the processor 200 monitors the available product inventory based upon the signals received from the sold-out detectors, such as the sold-out detector 130, and the malfunction detector circuits, such as the detector circuit 140. Specifically, the processor 200 determines whether the items which are generally available from the system 1 are currently unavailable for delivery to the delivery area 30. The processor 200 then selectively transmits signals representative of the images of the products which are presently available for delivery to the display 5, as shown in step 316. In response, only images or other representations of items which are considered to be presently available for purchase and delivery from the automatic transaction system 1 appear on the display, as indicated by step 318. In this manner, the images appearing on the display 5 are changed automatically based upon the results of monitoring the current availability of products for purchase and delivery from the apparatus 1. Furthermore, representations of products not currently available for purchase or delivery are automatically prevented from appearing on the display 5.

It should be noted that in some situations, such as where tampering of the system is likely to occur, it may be desirable to monitor the availability of the various items stored in the system 1 continuously or periodically rather than only in response to a customer initiated transaction. In this manner, if tampering or other conditions render a particular item unavailable for purchase or delivery, the unavailability of the particular product may be detected and monitored so that the image corresponding to that product does not appear on the display 5.

Figure 5A:
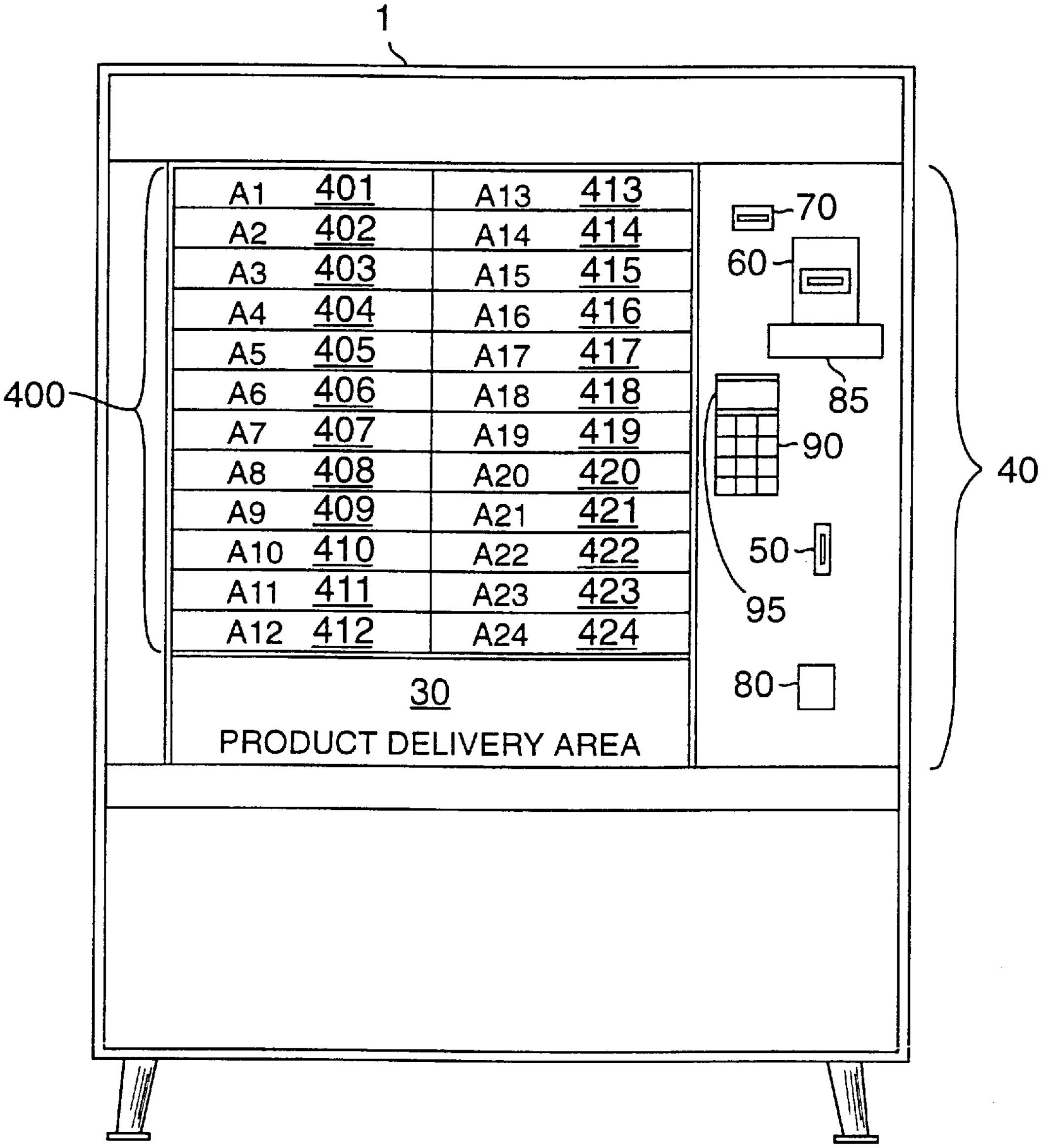
FIGS. 5A–5B show an illustration of how the images on the display change in response to a change in the available product inventory.
Figure 5B:
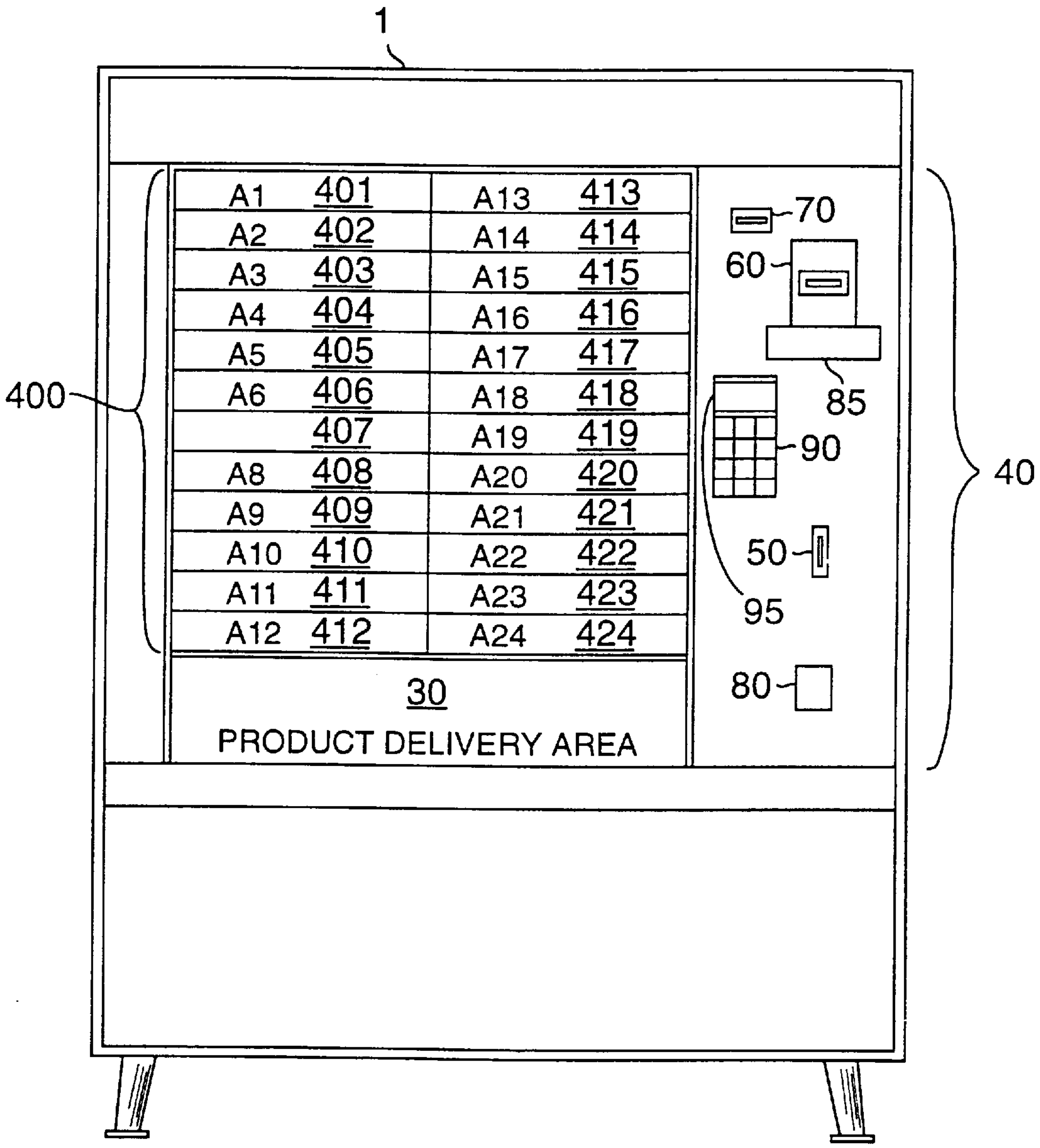

FIGS. 5A–5B show one illustration of how the images appearing on the display 5 would change in response to a change in the available product inventory. FIGS. 5A–5B show the display 5 in the form of a flip screen 400, having, for example, twenty-four individual display areas 401–424 each of which permits the image or other representation of an available item to appear on the display 400. FIG. 5A illustrates the situation where twenty-four different types of items are stored within the apparatus 1 and which are currently available for purchase by and delivery to a customer. The twenty-four item types are represented in FIG. 5A as A1 through A24.

FIG. 5B illustrates the situation after a customer has initiated a transaction resulting in the dispensing of the last remaining stored item of type A7. As the processor 200 monitors the available inventory stored within the apparatus 1, it receives signals indicating that the item type A7 is no longer currently available from the vending apparatus. The processor 200 sends appropriate signals to the flip screen 400 which removes the image corresponding to item A7 from the display area 407, as shown in FIG. 5B. The flip screen 400 can also reassign the images appearing on the display areas 401–424, so that empty areas appear at the bottom of the screen 400, for example. Alternatively, the image A7 can be replaced with the image or representation of another item which is still available from the vending apparatus.

Figure 6:
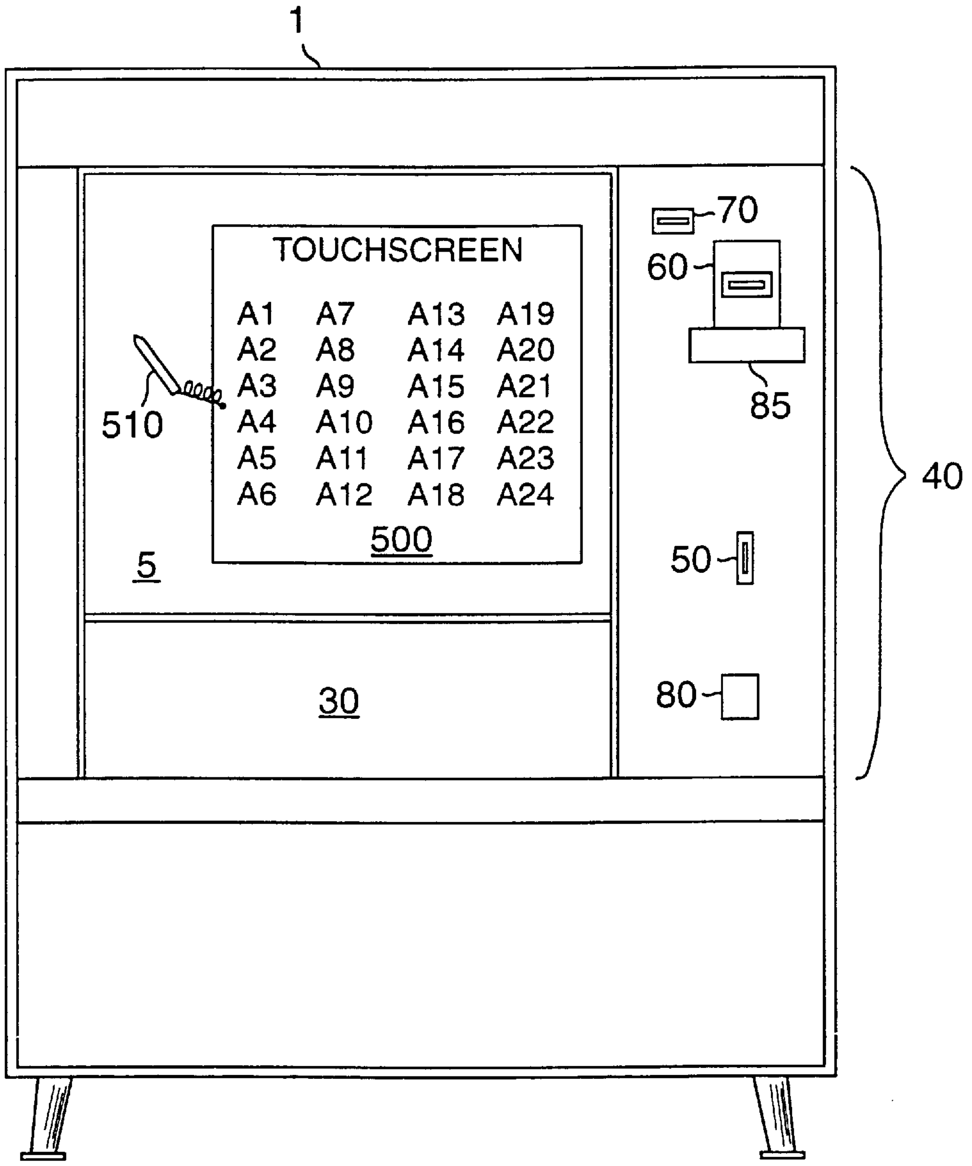
FIG. 6 illustrates an embodiment of the invention in which the display includes an interactive overlay or touchscreen.

FIG. 6 illustrates a further implementation of the invention, in which the display 5 includes an interactive overlay or touchscreen 500 which permits a customer to select a displayed product for purchase by touching the image or representation of the product or by using a stylus 510. The interactive overlay 500 thus can replace the keypad 90 which is no longer needed to permit the customer to enter the appropriate product code. In this embodiment, signals indicating the customer's selection are sent from the touchscreen 500 to the processor 200. The processor 200 then controls the dispensing of the appropriate product as explained above. The processor also controls the images and product representations appearing on the display in the manner described above.

Figure 7:
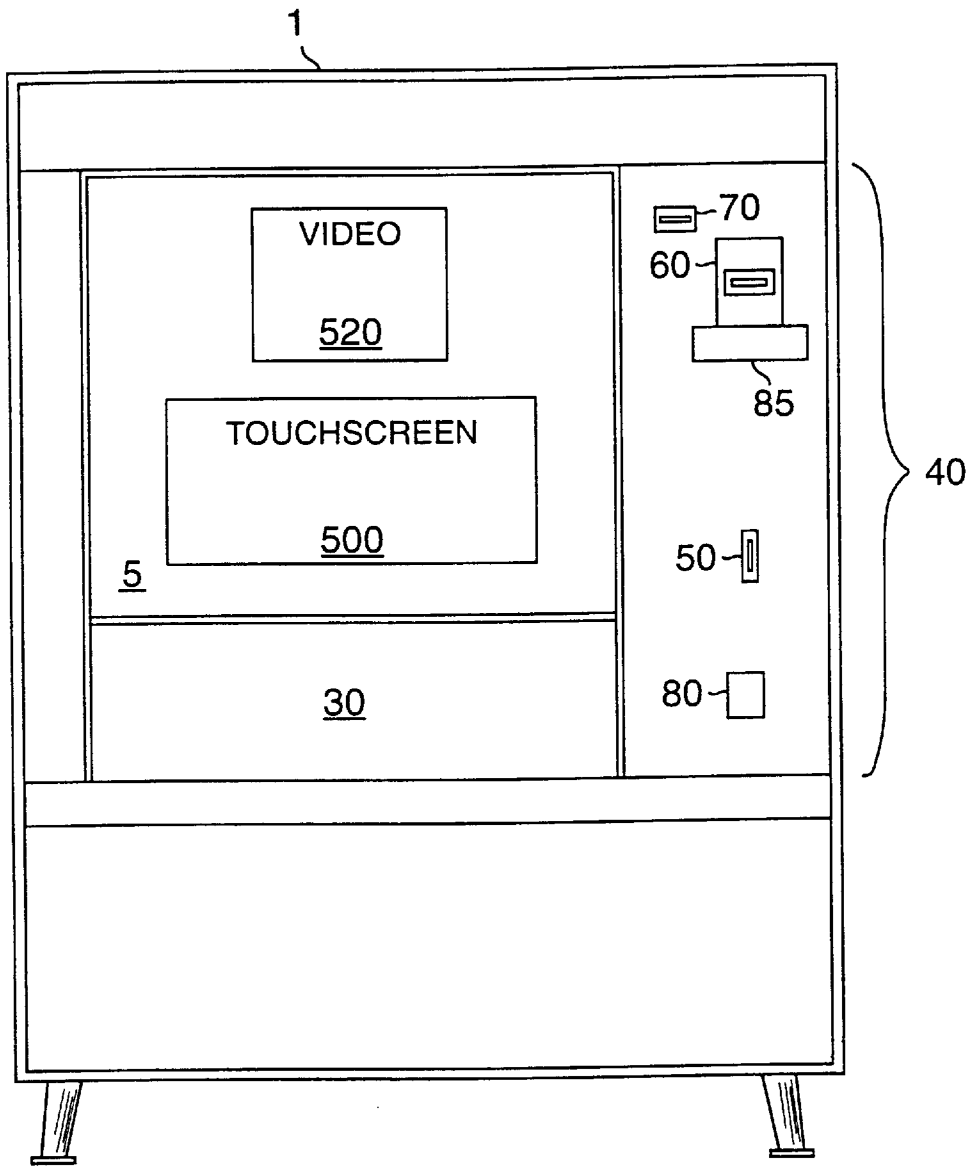
FIG. 7 illustrates an embodiment of the invention in which the display includes a video screen in addition to the touchscreen.

As a further enhancement, shown in FIG. 7, the display 5 can include, for example, a video screen 520 in addition to the touchscreen 500. When, for example, a customer selects a particular item for purchase by using the touchscreen 500, the processor 200 retrieves from memory a motion video which is played on the video screen 520. The motion video can be, for example, a brief advertisement related to the selected product which would appear on the video screen 520 during the vend operation and for a short period thereafter. The display 5 can also be used to display instructions on customer use of the apparatus 1 or other customer information.

Other implementations within the scope of the claims are contemplated.

What is claimed is:

1. A method of operating an automatic transaction apparatus providing a plurality of product types for purchase and including a display unit, the method comprising:

monitoring an inventory of each product type currently stored in the apparatus; and changing automatically representations of products appearing on the display unit in response to monitoring the inventory of the product types currently stored in the apparatus, wherein changing representations of products comprises displaying on the display unit representations only of products currently stored in the apparatus.

2. A method of operating an automatic transaction apparatus providing a plurality of product types for purchase and including a display unit, the method comprising:

monitoring an inventory of each product type currently stored in the apparatus including monitoring the current availability of various product types for delivery from the apparatus; and changing automatically representations of products appearing on the display unit in response to monitoring the inventory of the product types currently stored in the apparatus, wherein changing the representations of products comprises displaying on the display unit representations only of products currently available for delivery from the apparatus.

3. A method of operating an automatic transaction apparatus providing a plurality of product types for purchase and including a display unit, the method comprising:

monitoring an inventory of each product type currently stored in the apparatus; and changing automatically representations of products appearing on the display unit in response to monitoring the inventory of the product types currently stored in the apparatus, wherein changing the representations of products comprises changing alpha-numeric representations of products appearing on the display unit.

4. A method of operating an automatic transaction apparatus providing a plurality of product types for purchase and including a display unit, the method comprising:

monitoring an inventory of each product type currently stored in the apparatus; and changing automatically representations of products appearing on the display unit in response to monitoring the inventory of the product types currently stored in the apparatus, wherein changing the representations of product types appearing on the display comprises removing from the display unit representations of products that are not currently available for purchase from the apparatus.

5. The method of claim 4 wherein changing the representations of products comprises changing images of products appearing on the display unit.

6. The method of claim 5 wherein the images are still images.

7. The method of claim 5 wherein the images are dynamic images.

8. The method of claim 4 wherein changing the representations of products comprises changing representations of products appearing on the display unit of a vending machine.

9. The method of claim 4 wherein the apparatus comprises a plurality of product dispensers, the method further comprising storing each product type in a respective one or more of the product dispensers, wherein monitoring comprises generating a signal indicating the presence or absence of products in each product dispenser.

10. An automatic transaction apparatus comprising:

a front panel;

a display unit located on the front panel for displaying representations of product types available for purchase from the apparatus;

a vend dispensing unit for dispensing a selected one of the product types;

detectors for monitoring an inventory of each product type currently stored in the apparatus; and a processor for controlling the display unit in response to signals generated by the detectors so as to display on the display unit representations only of products currently stored in the apparatus.

11. The apparatus of claim 10 further comprising second detectors for monitoring the current availability of various product types for delivery from the apparatus, wherein the processor controls the display unit to display representations only of products currently available for delivery from the apparatus.

12. The apparatus of claim 11 wherein the display unit comprises a flip screen.

13. The apparatus of claim 11 wherein the display unit comprises a video screen.

14. The apparatus of claim 11 wherein the display unit comprises a flat screen display.

15. The apparatus of claim 11 wherein the display unit comprises one or more cathode ray tubes.

16. The apparatus of claim 11 wherein the display unit comprises a rear projection display.

17. The apparatus of claim 11 wherein the display unit comprises a touch screen which a customer uses to select one of the products for purchase.

18. The apparatus of claim 11 wherein the display unit comprises an interactive overlay which a customer uses to select one of the products for purchase.

* * * * *